United States Patent [19]
Goebel et al.

[11] Patent Number: 4,723,407
[45] Date of Patent: Feb. 9, 1988

[54] COMBINED GAS AND STEAM TURBINE POWER GENERATING STATION

[75] Inventors: Konrad Goebel, Erlangen; Hans-Chris Tränkenschuh, Forchheim-Kersbach, both of Fed. Rep. of Germany

[73] Assignee: Kraftwerk Union Aktiengesellschaft, Müheim, Fed. Rep. of Germany

[21] Appl. No.: 886,971

[22] Filed: Jul. 17, 1986

[30] Foreign Application Priority Data

Jul. 19, 1985 [DE] Fed. Rep. of Germany ....... 3525893

[51] Int. Cl.⁴ ................................. F02C 3/28
[52] U.S. Cl. ................. 60/39.12; 60/39.182
[58] Field of Search ...................... 60/39.12, 39.182

[56] References Cited

U.S. PATENT DOCUMENTS

| | | | |
|---|---|---|---|
| 4,261,166 | 4/1981 | Mayhofer | 60/39.12 |
| 4,288,979 | 9/1981 | Liljedahl et al. | 60/39.12 |
| 4,546,603 | 10/1985 | Arakawa et al. | 60/39.12 |

FOREIGN PATENT DOCUMENTS

| | | |
|---|---|---|
| 0129167 | 12/1984 | European Pat. Off. |
| 0137152 | 4/1985 | European Pat. Off. |
| 3319711 | 12/1984 | Fed. Rep. of Germany |

*Primary Examiner*—Louis J. Casaregola
*Attorney, Agent, or Firm*—Herbert L. Lerner; Laurence A. Greenberg

[57] ABSTRACT

A combined gas and steam turbine power generating station includes: a gas turbine part having a gas turbine and a combustion chamber connected to the gas turbine; a coal gasifier being connected upstream of the gas turbine part and having a raw gas side; a heat exchanger system being connected downstream of the raw gas side of the coal gasifier and including a first high-pressure steam generator, a raw gas/pure gas heat exchanger and a low-pressure steam generator; a gas purifier being connected downstream of the heat exchanger system and having a pure gas line leading to the combustion chamber of the gas turbine part; and a steam turbine power generating station part including a waste heat steam generator facility connected to the gas turbine of the gas turbine part for receiving exhaust gas therefrom, the waste heat steam generator facility including a second high-pressure steam generator, first heating surfaces and a second heating surface connected downstream of the first heating surfaces, the steam turbine power generating station part also including a steam turbine having a low-pressure steam feed and a feedwater line connected to the steam turbine having at least one first leg feeding the first heating surfaces with given pressure and a second leg feeding the second heating surface with pressure lower than the given pressure, and the second heating surface being connected as another low-pressure steam generator having an outlet side connected to the low-pressure steam feed.

3 Claims, 1 Drawing Figure

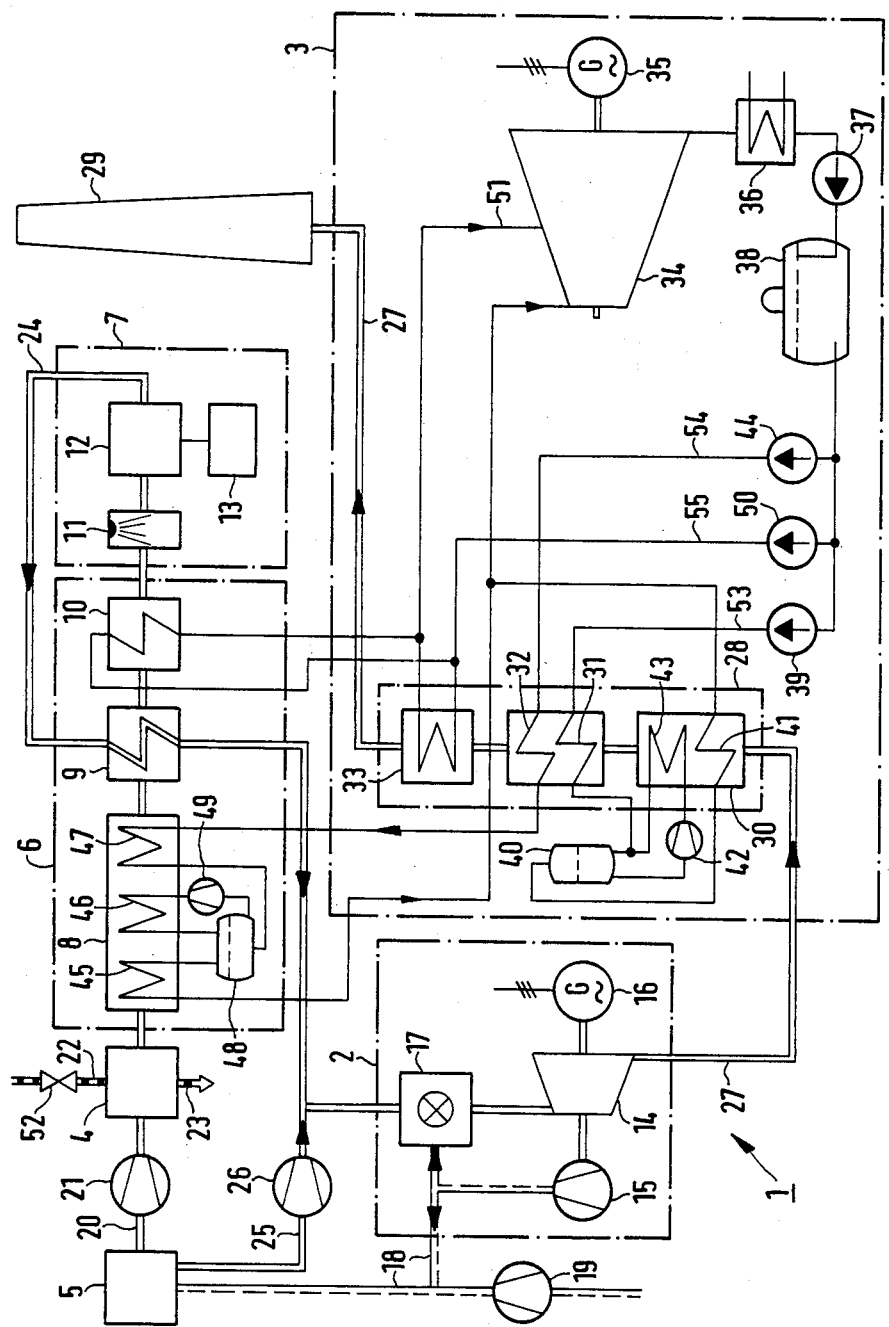

COMBINED GAS AND STEAM TURBINE POWER GENERATING STATION

The invention relates to a combined gas and steam turbine power generating station, including a coal gasifier upstream of a gas turbine part, a heat exchanger downstream of the coal gasifier on the raw gas side having a high-pressure steam generator, a raw gas/pure gas heat exchanger and a low-pressure steam generator, a gas purifier downstream of the heat exchanger system with a pure gas line leading from the gas purifier to the combustion chamber of the gas turbine, a waste heat steam generator system with another high-pressure steam generator and a steam turbine part of the power generating station connected to the waste heat steam generator system.

Such a combined gas and steam turbine power generating station is known from German Published, Non-Prosecuted Application DE-OS No. 33 19 711, corresponding to U.S. application Ser. No. 814,577. In the conventional combined gas and steam turbine power generating station, the hot raw gas leaving the coal gasifier is cooled down in a heat exchanger system before it is introduced into the gas purifier, to temperatures of about 100° C., which are compatible with the gas purifier. The heat released in the process is used as follows: In the high pressure steam generator of the heat exchanger system for generating high-pressure steam; in the raw gas/pure gas heat exchanger, for reheating the pure gas flowing toward the combustion chamber of the gas turbine; and in the low-pressure heat exchanger for generating low-pressure steam. In this conventional combined gas and steam turbine power generating station, the high-pressure steam and low-pressure steam generated in this manner is fed to a high-pressure steam turbine and a low-pressure steam turbine. Furthermore, in the prior art generating station additional high-pressure steam is generated in the waste heat steam generator through which the exhaust gas of the gas turbine flows. It is a particular advantage of such a gas and steam turbine power generating station that its output can be varied within wide limits. Even if the gas turbine is completely shut down and steam generation in the waste heat steam generator connected to the gas turbine ceases, the steam turbine can continue to be operated by means of the steam generated in the heat exchanger system following the coal gasifier, even if with a reduced output. Thus, the internal demand for electric power can be covered even in this extreme case by the generator driven by the steam turbine in the combined gas and steam turbine power generating station. However, the tangible heat of the raw gas downstream of the coal gasifier and the tangible heat of the exhaust gases of the gas turbine are not fully utilized.

It is accordingly an object of the invention to provide a combined gas and steam turbine power generating station, which overcomes the hereinafore-mentioned disadvantages of the heretofore-known devices of this general type, which utilizes the tangible heat of the raw gas downstream of the coal gasifier and which improves the use of the tangible heat of the exhaust gases of the gas turbine in a combined gas and steam turbine power generating station.

With the foregoing and other objects in view there is provided, in accordance with the invention, a combined gas and steam turbine power generating station, comprising:

a gas turbine part having a gas turbine and a combustion chamber connected to the gas turbine:

a coal gasifier being connected upstream of the gas turbine part and having a raw gas side;

a heat exchanger system being connected downstream of the raw gas side of the coal gasifier and including a first high-pressure steam generator, a raw gas/pure gas heat exchanger and a low-pressure steam generator:

a gas purifier being connected downstream of the heat exchanger system and having a pure gas line leading to the combustion chamber of the gas turbine part; and a steam turbine power generating station part including a waste heat steam generator facility connected to the gas turbine part for receiving exhaust gas therefrom, the waste heat steam generator facility including a second high-pressure steam generator, first heating surfaces and a second heating surface connected downstream of all of the first heating surfaces, the steam turbine power generating station part also including a steam turbine having a low-pressure steam feed and a feedwater line connected to the steam turbine having at least one first leg feeding the first heating surfaces with given pressure and a second leg feeding said second heating surface with pressure distinctly lower than the given pressure, and the second heating surface being connected as another low-pressure steam generator having an outlet side connected to the low-pressure steam feed.

The second heating surface downstream of all of the first heating surfaces of the waste heat steam generating facility makes it possible to still generate low-pressure steam, due to the fact that it is being fed with exhaust gases which are at a pressure that is reduced relative to the high-pressure heating surfaces and which are largely cooled down in this region of the waste heat steam generator facility of the gas turbine. This low-pressure steam can perform other work on addition to the partially expanded high-pressure steam in an appropriately constructed low-pressure part of the steam turbine.

In accordance with another feature of the invention, the first heating surfaces include heating surfaces heating feedwater flowing toward the first and second high-pressure steam generated and being connected downstream of the second heating surface on the gas side.

In accordance with a concomitant feature of the invention, the second heating surface is connected parallel to the low-pressure steam generator of the heat exchanger system.

Other features which are considered as characteristic for the invention are set forth in the appended claims.

Although the invention is illustrated and described herein as embodied in a combined gas and steam turbine power generating station, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the single figure of the drawing, which is a schematic diagram of individual heat exchanger heating surfaces and their mutual interconnection in a combined gas and steam turbine power generating station according to the invention.

Referring now to the figure of the drawing in detail and first, particularly, to FIG. 1 thereof, there are seen individual components of a combined gas and steam turbine power generating station 1 and their mutual interconnection.

The combined gas and steam turbine power generating station is substantially formed of a gas turbine power generating part 2, a steam turbine power generating part 3, a coal gasifier 4 preceding the gas turbine power generating station part 2, an air decomposition system 5 preceding the coal gasifier, a heat exchanger system 6 following the coal gasifier 4 on the raw gas side and a gas purifier 7 following the heat exchanger 6. The heat exchanger system 6 includes a high-pressure steam generator 8, a raw gas/pure gas heat exchanger 9 and a low-pressure steam generator 10. In the illustrated embodiment, the gas purifier 7 connected to the heat exchanger 6 includes a raw gas scrubber 11, a hydrogen sulfide absorption system 12 and a sulfur production facility 13. The gas turbine power generating station part 2 contains a gas turbine 14 as well as an air compressor 15 and a generator 16 driven by the gas turbine. A fresh air line 18 which leads to the air compressor 15 also leads to a combustion chamber 17 of the gas turbine as well as to the air decomposition system 5. An air compressor 19 which can be switched on if required and can be driven separately, is also connected to the fresh air line 18 leading to the air decomposition system 5. An oxygen line 20 leaving the air decomposition system 5 is connected to the coal gasifier 4 through an oxygen compressor 21. A coal feeding line 22 and an ash discharge line 23 of the coal gasifier 4 are also shown. A pure gas line 24 leaving the gas purifier 7 is conducted through the raw gas/pure gas heat exchanger 9 of the heat exchanger system 6 and is connected to the combustion chamber 17 of the gas turbine 14. A nitrogen line 25 leaving the air decomposition system 5 is also connected to the combustion chamber 17 of the gas turbine 14 through a nitrogen compressor 26.

An exhaust gas line 27 of the gas turbine 14 leads through a waste heat steam generator facility 28 and subsequently discharges into a flue 29. As seen in flow direction of the exhaust gas, the waste heat steam generator system 28 includes a high-pressure steam generator 30, two feed-water heating surfaces 31, 32 and a low-pressure steam generator 33.

A steam turbine 34 of the steam turbine power generating station part 3 is coupled to a generator 35 and is connected to a condenser 36 on the exhaust steam side. The condenser 36 is emptied by a condensate pump 37 into a feedwater tank 38. A first leg 53 of a feedwater line which is connected to the feedwater tank 38, is provided with a feedwater pump 39 and is connected through the feed water heating surface 31 of the waste heat steam generator facility 28 following the high-pressure steam generator 30, to a water/steam separating vessel 40. The steam side of the water/steam separating vessel 40 is connected to a superheater heating surface 41 of the high-pressure steam generator 30 of the waste heat steam generator 28.

The superheater heating surface 41 is connected to the high-pressure side of the steam turbine 34. The water side of the water/steam separating vessel 40 is connected through a separate feed pump 42 to a high-pressure steam generating heating surface or evaporator heating surface 43 which is connected to one of the superheater heating surfaces 41 on the gas side. The output side of the heating surface 43 is connected to the water/steam separating vessel 40.

A second leg 54 of the feedwater line which is connected to the feed water tank 38, is provided with a feedwater pump 44 and is connected to the feedwater heating surface 32 of the waste heat steam generator facility 28 which is connected to the above-mentioned feedwater heating surface 31 on the gas side. The last-mentioned feedwater heating surface 32 is connected to the high-pressure steam generator 8 of the heat exchanger 6 following the coal gasifier 4. In the illustrated embodiment, the high-pressure steam generator 8 is equipped with three heating surfaces, the heating surfaces thereof facing the coal gasifier 4 being constructed as a superheater heating surface 45 and the other two heating surfaces being constructed as first and second evaporator heating surfaces 46, 47. The second evaporator heating surface 47 facing away from the coal gasifier 4, is connected on the input side to the last-mentioned feedwater heating surface 32 of the waste heat steam generator facility 28 and on the output side to a water/steam separating vessel 48. The water/steam separating vessel 48 is connected on the water side through a feed pump 49 to the first evaporator heating surface 46 of the high-pressure steam generator 8 which in turn discharges on the output side into the water space of the water/steam separating vessel 48. On the steam side, the water/steam separating vessel 48 is connected to the superheater heating surface 45 of the high-pressure steam generator 8. The superheater heating surface 45 is also connected on the output side to the high-pressure side of the steam turbine 34.

A third leg 55 of the feedwater line is equipped with a feedwater pump 50, is connected to the low-pressure steam generator 33 following all of the other heating surfaces of the waste heat steam generator facility 28 and is connected to the low-pressure steam generator 10 which is connected parallel to the generator 33 and follows all of the other heating surfaces of the heat exchanger plant 6. On the output side, these two low-pressure steam generators 33, 10 are connected to a center feed 51 of the steam turbine 34.

During the operation of the combined gas and steam turbine power generating station 1, air is transported by the air compressor 15 mounted on the shaft of the gas turbine 14 into the combustion chamber 17 as well as into the air line 18 of the air decomposition plant 5. The oxygen compressor 21 connected in the oxygen line 20 of the air decomposition system 5 feeds oxygen into the charged coal gasifier 4 through the coal feeding line 22 which can be closed off by means of a gas-tight lock 52, so that finely milled coal is transported into the coal gasifier 4. The raw gas generated in the coal gasifier flows in the heat exchanger system 6, first through the superheater heating surface 45 and then through the first and second evaporator heating surfaces 46 and 47 of the high-pressure steam generator 8. Thereupon, the raw gas flows into the raw gas/pure gas heat exchanger 9 and into the low-pressure steam generator 10. The raw gas which is cooled down to about 100° C. is fed in the gas purifier 7 through the raw gas scrubber 11 to the hydrogen sulfide absorption system 12. The washed-out sulfur compounds are reduced in the sulfur production facility 13 following the hydrogen sulfide absorption plant, to form pure sulfur. The pure gas leaving the hydrogen sulfide absorption plant 12 is warmed again in the raw gas/pure gas heat exchanger 9 and fed to the combustion chamber 17 of the gas turbine 14 together with the nitrogen flowing in from the air decomposition plant 5. The nitrogen compressor 26 is built into the nitrogen line 25 for bridging the pressure difference.

The exhaust gas leaving the gas turbine 14 flows through the exhaust gas line 27 into the waste heat steam generator facility 28, where it first flows through the superheater heating surfaces 41, to the evaporator heating surface 43 of the high-pressure steam generator 30. The exhaust gas then flows through the feedwater heating surfaces 31, 32 and the low-pressure steam generator 33. The exhaust gas which is thus cooled down to about 120° C. is discharged into the flue 29.

The additional heating surface 33 which is connected downstream, not only further utilizes the heat of the exhaust gases of the gas turbine, which in this region of the waste heat steam generator facility 28 are already largely cooled down, for generating at least low-pressure steam, but this quantity of low-pressure steam is additionally fed to the common low-pressure part of the steam turbine 34 without appreciable additional construction, due to the parallel connection to the low-pressure steam generator of the heat exchanger plant 6 following the coal gasifier. This is possible because of the use of the same low-pressure piping system, the same low-pressure feedwater pump 50 and the same center feed 51.

The foregoing is a description corresponding in substance to German Application No. P 35 25 893.4, dated July 19, 1985, the International priority of which is being claimed for the instant application, and which is hereby made part of this application. Any material discrepancies between the foregoing specification and the aforementioned corresponding German application are to be resolved in favor of the latter.

We claim:

1. Combined gas and steam turbine power generating station, comprising:
    a gas turbine part having a gas turbine with an exhaust gas line and a combustion chamber connected to said gas turbine;
    a coal gasifier being connected upstream of said gas turbine part and having a raw gas line;
    a heat exchanger system connected downstream of said raw gas line of said coal gasifier and including a first high-pressure steam generator, a raw gas/pure gas heat exchanger and a first low-pressure steam generator;
    a gas purifier being connected downstream of said heat exchanger system and having a pure gas line leading to said combustion chamber of said gas turbine part; and
    a steam turbine power generating station part including a waste heat steam generator facility connected to said exhaust gas line of said gas turbine for receiving exhaust gas therefrom, said waste heat steam generator facility including a second high-pressure steam generator, first and second preheating surfaces each being connected upstream of a respective one of said first and second high-pressure steam generators, and a second low-pressure steam generator connected downstream of said first and second preheating surfaces and said second high-pressure steam generator, as seen in exhaust gas flow direction, said steam turbin power generating station part also including a steam turbine having a low-pressure steam feed line and a high-pressure steam feed line connected to said steam turbine, feed water lines being connected to both of said low-pressure steam generators, means for providing said feed water lines with pressures lower than in said first and second preheating surfaces, and low-pressure steam lines connecting both of said low-pressure steam generators to said low-pressure steam feed line of said steam turbine.

2. Combined gas and steam turbine power generating station according to claim 1, wherein said first and second preheating surfaces heat feedwater flowing toward said first and second high-pressure steam generators and are connected upstream of said second low-pressure steam generator, as seen in exhaust gas flow direction.

3. Combined gas and steam turbine power generating station according to claim 1, wherein said second low-pressure steam generator is connected parallel to said first low-pressure steam generator of said heat exchanger system which is downstream of said coal gasifier in said raw gas line.

* * * * *